United States Patent [19]

Rakieski

[11] Patent Number: 4,809,949
[45] Date of Patent: Mar. 7, 1989

[54] PLUG VALVE

[75] Inventor: Kenneth E. Rakieski, Gifford, Pa.

[73] Assignee: Dresser Industries, Inc., Dallas, Tex.

[21] Appl. No.: 148,680

[22] Filed: Jan. 26, 1988

[51] Int. Cl.⁴ .............................................. F16K 5/06
[52] U.S. Cl. ..................... 251/310; 251/312; 251/316; 251/287; 137/382
[58] Field of Search ............... 251/171, 214, 304, 309, 251/310, 312, 315, 316, 904, 286, 287; 137/377, 382

[56] References Cited

U.S. PATENT DOCUMENTS

| | | | |
|---|---|---|---|
| 2,529,412 | 11/1950 | Parker | 251/310 X |
| 2,558,260 | 6/1951 | Moby | 251/310 X |
| 2,840,109 | 6/1958 | Wadleigh | 251/310 X |
| 2,929,406 | 3/1900 | Anderson | 251/310 X |
| 2,967,042 | 1/1961 | Richter . | |
| 3,066,908 | 12/1962 | Floren et al. | 251/287 |
| 3,192,948 | 7/1965 | Anderson et al. . | |
| 3,273,852 | 9/1966 | Ripert | 251/171 |
| 3,331,582 | 7/1967 | Ford . | |
| 3,393,704 | 7/1968 | McFarland, Jr. . | |
| 3,437,106 | 4/1969 | Mueller et al. | 137/382 |
| 3,735,956 | 5/1973 | Matousek . | |
| 3,940,107 | 2/1976 | Allenbaugh, Jr. . | |
| 3,983,594 | 10/1976 | Simonelli . | |
| 4,010,930 | 3/1977 | Sands | 251/309 X |
| 4,076,211 | 2/1978 | Krechel et al. | 251/315 X |
| 4,449,692 | 5/1984 | Rhodes | 251/904 X |
| 4,552,335 | 11/1985 | Alexander et al. . | |
| 4,610,266 | 9/1986 | Sandling . | |
| 4,650,157 | 3/1987 | Sillaman et al. . | |

Primary Examiner—A. Michael Chambers
Assistant Examiner—John C. Fox

[57] ABSTRACT

Plug-type angle valve comprising a valve body and a unitary valve plug formed of a plastic material. The valve body has upper and lower trunnion seats and at least two fluid ports, one being a control port located at a position intermediate the trunnion seats. Another of the ports is an angularly displaced lower port extending through the lower trunnion seat. The valve plug has upper and lower trunnion sections journaled in the trunnion seats and an intermediate spherical control section between the trunnion sections and located adjacent the control port. A control passage extends from a lower opening in the valve plug aligned with the lower port to a second opening in the intermediate section of the valve plug. The valve plug is rotatable between a valve open position in which the section opening in the valve plug is aligned with the control port, position, and a second angular position in which the plug opening is displaced from the control port so that the outer surface of the intermediate section closes the control port.

31 Claims, 3 Drawing Sheets

PLUG VALVE

TECHNICAL FIELD

This invention relates to plug type flow control valves and more particularly to angle valves having spaced trunnion mountings and employing unitary control plugs and improved compression sealing means.

ART BACKGROUND

Plug valves employed for the control of fluids through conduits such as pipelines and the like comprise a valve body having two or more ports with associated pipe joint connectors and an internal control plug. The plug is rotatable between several positions in order to shutoff or permit the flow of fluid through the valve. The valve plugs may be of a generally spherical shape as in the case of so called "ball valves" or they may be of cylindrical or tapered configuration. Such valves may be in-line valves in which the outlet and inlet ports are generally diametrically opposed relative to one another or they may be angle type valves in which the inlet and outlet ports are angularly disposed, normally at an angle of 90°, with respect to one another.

A common expedient in plug valves is to encase the valve plug in one or more resilient seat members positioned within the barrel of the valve casing. For example, U.S. Pat. No. 3,192,948 to Anderson et al discloses in-line and angle-type ball valves in which a generally spherical valve member is mounted within a conforming seat member formed of a resilient materials such as polyethylene halides, e.g. teflon, polyamides or nylons. The seat member is sufficiently deformable to accommodate minor surface irregularities. The spherical valve member includes an integral stem which extends upwardly through openings in the seat member and the surrounding cage structure to the exterior of the valve. A bonnet having an aperture through which the valve member stem extends closes the upper opening of the valve cage and covers a resilient pressure acting stem seal.

U.S. Pat. No. 3,735,956 to Matousek discloses a three-way angle ball valve in which a generally spherical valve plug is mounted within the valve body on articulated packing material formed in two pieces of a resilient plastic material. The packing sections, when fitted together, form openings aligned with the control ports in the valve body and have cylindrical recess sections which leave a lip of packing material adjacent the ball member. Metal ring members are mounted within the packing material recesses to maintain the lips in engagement with the surface of the ball member.

Another valve configuration employing an in-line ball valve in which a flow control element is disposed between inlet and outlet ports and supported on resilient seat members as disclosed in U.S. Pat. No. 4,552,335 to Alexander et al. In Alexander, the seat members include an internal core member, an annular metal reinforcing ring for the core member, and face body and rear body seals formed of an elastomeric material such as neoprene. The ball element is said to float within the valve housing and is not directly connected to a drive trunnion so that it can seek its own position relative to the downstream seat to provide improved sealing action. The seats and floating ball member are held in place within the valve body by means of a threaded end cap which is provided with an O-ring seal between the valve barrel and the end cap.

In addition to forming valve seats of resilient materials, plug-type valves can also employ control members formed of such materials. Thus, U.S. Pat. No. 2,967,042 to Richter discloses an angle-type shutoff valve in which a tapered plug member is rotatably mounted within a valve body against a conforming tapered sealing ring. Both the valve plug member and the tapered sealing ring are formed of a plastic material such as high density polyethylene which has a slight resiliency.

U.S. Pat. No. 3,940,107 to Allenbaugh discloses an in-line ball valve structure in which a ball member is rotatably mounted on a lower pivot pin threadedly secured in the valve housing and is actuated by a diametrically opposed upper drive trunnion. The inlet and outlet ports in the valve body are provided with annular seal elements formed of a synthetic resin. Each seal resin is provided with an opening defined by a conically divergent lip portion which seats on the spherical surface of the ball element.

SUMMARY OF THE INVENTION

In accordance with the present invention, there is provided a plug-type valve for controlling fluid flow which is characterized by several significant advantages over prior art valves of the type disclosed in the aforementioned references. In one aspect of the invention, there is provided an angle-type ball valve comprising a valve body which may be formed of a metal such as ductile iron and a unitary valve plug formed of a plastic material. The valve body has upper and lower trunnion seats and at least two fluid ports. One of the ports is a control port located at a position intermediate the trunnion seats. Another of the ports is a lower port angularly displaced relative to the control port and extending through the lower trunnion seat. The valve plug has upper and lower trunnion sections journaled in the trunnion seats and an intermediate control section between the trunnion sections. The intermediate section, which preferably is of a spherical configuration, is located adjacent the control port. The valve plug is provided with a control passage extending from a lower opening in the valve plug aligned with the lower port to a second opening in the intermediate section of the valve plug. The valve plug is provided with an actuating means for rotating the valve plug relative to the valve body within the trunnion seats. The plug is rotatable between a first position in which the second opening in the valve plug is aligned with the control port, i.e. valve open position, and a second angular position in which the second plug opening is displaced relative to the control port so that the outer surface of the intermediate section closes the control port.

In a further aspect of the invention, the control port is provided by an end section of a valve branch which is threadedly secured within an internally threaded opening in the side of the valve body. An annular compressible seat gasket is disposed inside of the valve branch and extends into contact with the curved surface of the intermediate portion of the valve plug. The seat gasket thus provides a seal between the control portion and the valve plug. Preferably, the seat gasket is provided with an interiorly extending shoulder section. An annular gasket retainer formed of metal or other suitable rigid material is disposed rearwardly of the gasket shoulder and compressed against the gasket shoulder by the valve branch.

In yet a further aspect of the invention, the intermediate portion of the valve plug has a reduced cord face in which the plug opening adapted to be aligned with the control port is located. The reduced cord face may be formed by simply removing a section of the spherical surface. When the valve plug is in the open position so that the plug opening is aligned with the control port, the compressible seat gasket is only lightly compressed or may actually be under no compressive stress. When the plug valve is rotated to a closed position, the encroaching surface of the spherical plug surface compresses the gasket to ensure a fluid tight seal.

DETAILED DESCRIPTION OF THE INVENTION

Figure 1:
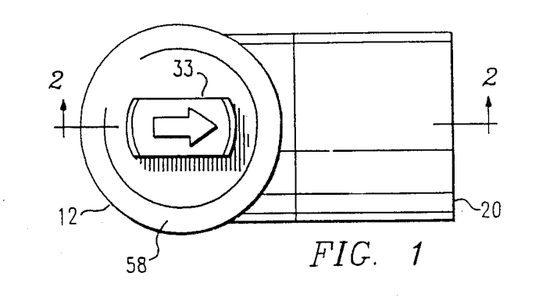
FIG. 1 is a plan view of a valve embodying the present invention.
Figure 2:
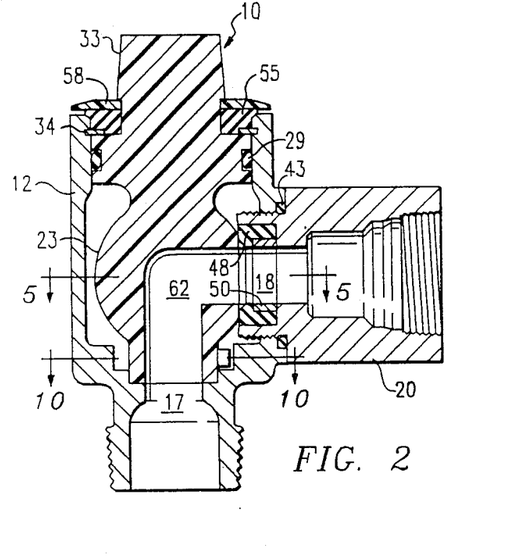
FIG. 2 is a sectional view taken along line 2—2 of FIG. 1.

Referring to the drawings, FIG. 1 is a plan view of a 90° angle valve embodying the present invention. FIG. 2 is a side sectional view taken along line 2—2 of FIG. 1 and FIG. 3 is an exploded view of components and corresponds to the side elevational view shown in FIG. 2.

Figures 3, 10:
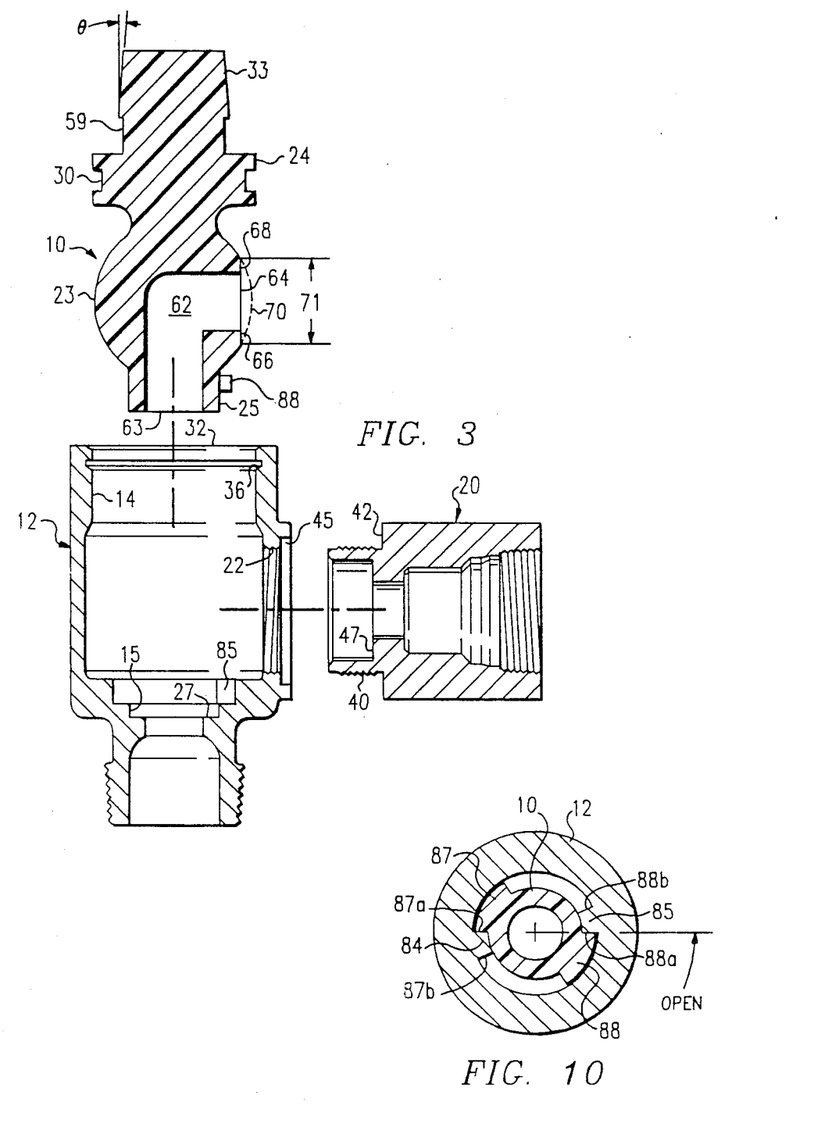
FIG. 3 is a side elevational view in section showing major unassembled components of the valve of FIGS. 1 and 2.
FIG. 10 is a sectional view taken along line 10—10 of FIG. 2.

Referring particularly to FIGS. 2 and 3 the valve comprises a valve plug 10 rotatively mounted in the barrel of a valve body 12. Valve body 12 typically is formed of a suitable corrosion resistant metal such as ductile iron and, as described in greater detail below, the valve plug 10 preferably is a unitary body formed of a plastic. The plastic used in fabricating the valve plug may be either a thermoset or thermoplastic polymer. Also the polymeric material used in forming the valve plug may be composited with materials such as reinforcing fibers in order to provide added strength to the plug structure. As will become apparent from the following description, the use of a plastic valve plug in accordance with the present invention is advantageous in avoiding problems associated with corrosion and "freezing" of the valve plug relative to the valve body. In addition the valve plug can be conveniently and economically molded in a unitary body of relatively high strength.

The valve body is provided with upper and lower bearing surfaces 14 and 15 which function as trunnion seats for trunning sections formed in the valve plug. The valve body is provided with a plurality of ports 17 and 18 accommodating fluid flow to and from the valve body. The side port 18, designated herein as the control port, is provided by means of a removable valve branch 20 which is threaded into an opening 22 in the side of the valve body 12 as described in greater detail below.

The valve plug 10 comprises an intermediate control section 23 and is rotatably mounted in the valve barrel by means of upper and lower trunnion sections 24 and 25 which are journaled in their respective trunnion seats. The use of upper and lower trunnions is particularly important in maintaining alignment of the valve plug relative to the valve body. The lower trunnion seat 15 comprises a shoulder 27 to support the valve plug in a thrust bearing as well as a radial bearing relationship.

The valve body and plug may be easily assembled to provide a relatively tamper proof assembly. In assembling the valve structure, an O-ring seal 29 is inserted in a circumferential groove 30 in the upper trunnion section 24. The plastic valve plug 10 is inserted into the top of the valve body through its open upper end 32. The upper portion 33 of the plug protrudes from the valve body and functions as an actuating member. Thereafter, a split retaining ring 34 is inserted around the upper portion of the valve plug and slipped into annular groove 36 in the valve body so that it abuts the upper surface of trunnion section 24. After insertion of the plug 10 into the valve body the valve branch 20 may be assembled to the main valve barrel. Valve branch 20 comprises a reduced, externally threaded end section 40 which fits into the internally threaded opening 22 in the side of the valve barrel. The branch fitting 20 has an external shoulder 42 which functions to compress a branch gasket 43 into a recess 45 formed in the side of the valve barrel around the threaded opening 22. As explained in greater detail below, the branch gasket 43 provides a static seal and avoids the need for a dynamic seal between the valve body and the valve plug at the lower trunnion connection.

Figure 4:
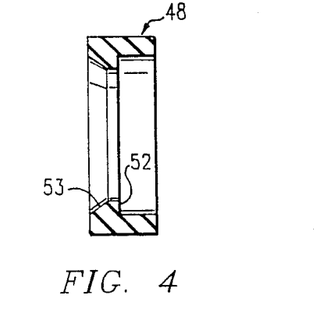
FIG. 4 is a sectional view of a valve seat gasket employed in the invention.

The reduced end section of the valve branch is provided with an end internal shoulder 47 which accommodates a compressible valve seat gasket 48 and an annular gasket retaining ring 50. The seat gasket is formed of rubber or other suitable compressible material and, as best shown in FIG. 4, is provided with an inwardly extending annular shoulder section 52. The gasket retaining ring 50 fits inside the seat gasket 48 and abuts the shoulder 52. The inner face of gasket 48 is partially beveled to provide a flared surface 53. The gasket retaining ring 50 has sufficient length such that when the valve branch is threaded into place in opening 22, the internal branch shoulder 47 forces ring 50 against the shoulder 52, compressing the same against the intermediate section of the valve plug. Instead of providing a separate gasket retaining ring as shown, the ring structure to compress the gasket shoulder 52 can be formed integrally with branch member 20. In this case, it would extend outwardly from shoulder 47 and be concentrically spaced from the threaded joint in order to provide a recess into which gasket 48 fits.

As described below, the valve plug is configured relative to the control port and seal provided by gasket 48 such that an increased compressive stress is imparted to the gasket when the valve is placed in the "off" position.

After insertion of the valve plug and retainer ring 34 an annular packing 55 is inserted on top of the upper trunnion section 24. Packing 55 functions as a moisture seal and preferably is a closed cell elastomeric material in which discrete cells, e.g., air bubbles, are disposed throughout an elastomeric matrix. Such closed cell products may be formed by the decomposition of blowing agents within a molten rubber matrix material as will be readily understood by those skilled in the art. An expansion absorbing packing element formed of such closed cellular material underneath the valve bonnet of an in-line ball valve is disclosed in U.S. Pat. No. 3,393,704 to McFarland. Material of the type disclosed in McFarland may be used in formulating the annular packing member 55. The use of the closed cell elastomeric seal prevents the accumulation of water above the upper trunnion section which would cause corrosion problems and be subject to freezing at cold temperatures.

After placing the moisture seal 55 in place, the assembly is completed with a plastic bonnet cap 58 which fits over the actuating stem 33 into a snap fit in reduced portion 59 of the valve plug immediately above the upper trunnion section. In order to accommodate insertion of the bonnet cap over the externally protruding plug stem 33, the plug stem is tapered somewhat as shown. For example the plug stem may be provided with a draft angle $\theta$ of about 5°.

The valve plug is provided with a passageway 62 which extends from the lower plug opening 63, which is in fluid communication with the lower valve port 17, to a second opening 64 in the intermediate section 23 of the valve plug. The intermediate valve section 23 preferably is of a generally spherical shape as shown and is provided with a reduced cord face 66 in which the second control passage opening 64 is located.

Figure 5:
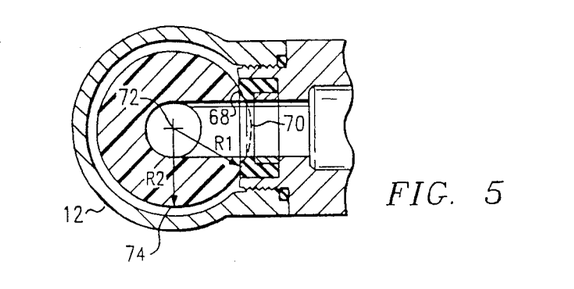
FIG. 5 is a sectional view taken along line 5—5 of FIG. 2.

The reduced cord section can be formed by removing a sufficient portion of the spherical face of section 23 to provide a cord distance somewhat greater than the diameter of opening 64. Thus, the annular lip surface 68 on control section 23 immediately adjacent the opening 64 is of a slightly smaller radial distance from the axis of rotation of the valve plug than is the more remote sealing surface of section 23. This configuration is best shown in FIG. 3 and in FIG. 5 which is a cross sectional view taken along line 5—5 of FIG. 2. As illustrated, the reduced cord segment is a flat surface. However, it may be curved slightly; the radius of curvature being substantially greater than the spherical radius. In FIGS. 3 and 5, the arc segment subtended by the flattened cord segment is indicated by broken line 70. By way of example, for a valve plug having an intermediate spherical segment of two inches in diameter with an opening 64 having a diameter of 13/16 inch, the diameter 71 of the flattened cord surface may be about 1⅜ inches and the arc segment subtended by the flattened cord surface would be about 48° degrees. As best shown in FIG. 5, the radial distance R1 from the plug axis 72 to the lip are 68 is slightly less than the radial distance R2 to the sealing area 74 of the plug surface. In the example given above, the dimension R1 would be 0.219 inches less than dimension R2. With the plug member in the open position as illustrated in FIGS. 3 and 5, there is only a moderate compressive force between the valve gasket 48 and the lip surface 68. When the valve is rotated by 90° so that the valve plug surface 74 shown in FIG. 5 is adjacent the control port, the compressive force between the valve gasket and the plug surface is significantly increased. In this embodiment of the invention, the leakage past the valve gasket when the valve plug is in the closed position is minimized since the valve gasket 48 takes a very little compression set when the valve is in the open position.

If desired, the valve of the present invention can be provided with one or more additional control ports to provide a multi way valve. For example, the valve body may be provided with a second control port to provide a three way valve configuration. The second port may be diametrically opposed to port 18 to provide a configuration of the type shown in the aforementioned patent to Matousek. The second control port may be identical to the control port 18 illustrated in FIG. 2. Alternatively, the second control port may be circumferentially displaced relative to the first control port by less than 180°, e.g. by 90°. In either case, the second control port may be, and preferably is, provided with a gasket seal arrangement corresponding to the gasket seal arrangement for the control port illustrated in FIG. 2.

Figure 6:
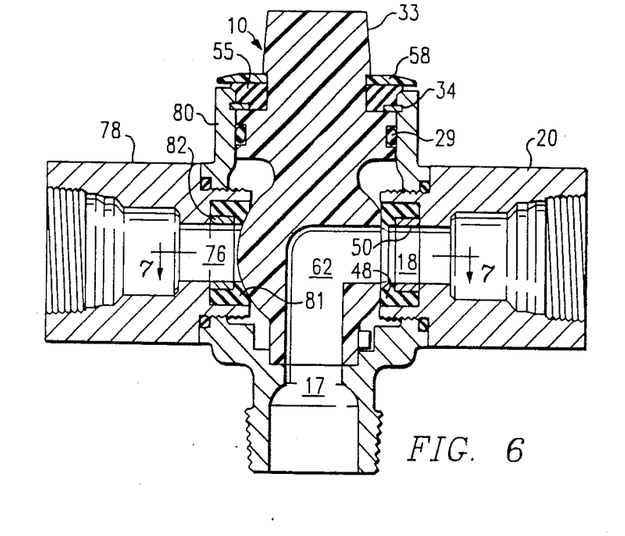
FIG. 6 is a side elevational view, with parts in section, showing another embodiment of the invention.
Figure 7:
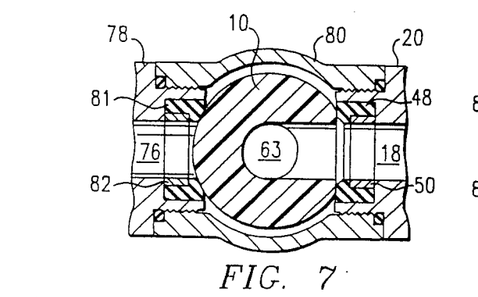
FIG. 7 is a transverse sectional view of the embodiment illustrated in FIG. 6 taken along line 7—7 of FIG. 6.

A suitable configuration for such a multi-wave valve configuration is illustrated in FIG. 6. FIG. 6 is a side elevational sectional view similar to FIG. 2 but showing a second control port diametrically opposed to the control port 18. The second control port 76 is provided by means of a valve branch 78 threaded into the side of valve barrel 80. Valve branch 78 is provided with a gasket seal 81 and retaining ring 82 identical to those shown in FIG. 2. Other than the valve body 80 (which is provided with a second threaded opening to accommodate valve branch 78) and the valve branch 78 and associated seal components, the valve structure of FIG. 6 is identical to that shown in FIG. 2 and like elements are indicated by the same reference numerals as used in FIG. 2. FIG. 7 is a schematic sectional view, somewhat similar to FIG. 5, showing the plug and port arrangement of FIG. 6. As shown in FIG. 7, the plug may be rotated from the position illustrated in FIG. 7 by 90° to close the valve and by 180° to open the inlet port to control port 76 while retaining the port 18 in the closed position.

Figure 8:
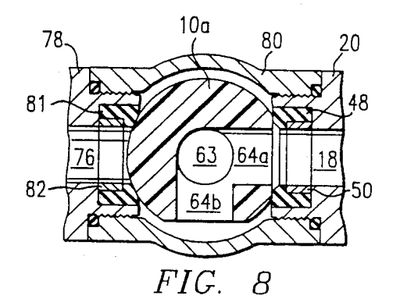
FIG. 8 is a transverse sectional view similar to FIG. 7 but showing another embodiment of the invention.

An alternative arrangement in which the valve plug 10a is provided with two outlet openings 64a and 64b is illustrated in FIG. 8. Here the valve can be switched to a position to close port 18 while opening port 76 to aperture 64b by rotating the valve plug through 90° in clockwise rotation. If it is desired to provide a closed position for the valve of FIG. 8 (where both of ports 76 and 18 are closed), the valve body ports and the valve plug openings can be dimensioned such so to permit an intermediate closed position when the valve plug is rotated 45° from the position shown in FIG. 8. Alternatively, rather than control port 76 being in-line with control port 18, port 76 can be located at an angularly displaced position, for example, 270° clockwise, from control port 18. In this case, the valve plug can be rotated 90° to completely close the valve, and 180° to place opening 64B in communication with the angularly displaced outlet port.

Figure 9:
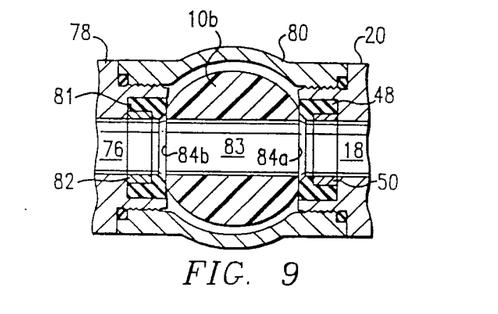
FIG. 9 is a transverse sectional view similar to FIGS. 7 and 8 but illustrating yet another embodiment of the invention.

Yet a further embodiment of the invention involving an in-line valve is illustrated in FIG. 9. Here the valve plug 10b is provided with a single passage 83 terminating in openings 84a and 84b and connecting control port 76, serving as an inlet port, and control port 18, serving as an outlet port. In the position illustrated in FIG. 9, the valve is open. It can be closed by rotating the plug sufficiently so that passageway 83 is no longer in communication with the valve ports. In all of the embodiments described above, the dual trunnion mounting together with the compressive gasket configuration and the plastic valve plug offer a number of advantages over the prior art systems. The plastic plug itself can be economically constructed as a unitary body which would eliminate several separate parts, requiring close tolerances for proper assembly. The use of plastic for the plug eliminates the possibility of valve freeze up because of corrosion between adjacent metal parts. The dual trunnion configuration provides for a low operating torque for the valve while retaining good alignment between the control surface of the plug and the outlet port and gasket. This is retained even though substantial temperature changes may cause differential expansion and contraction between the valve plug and the metal valve body occasioned by the different coefficients of thermal expansion for the valve plug and the metal valve housing.

The branch gasket or gaskets 43 perform important functions including obviating the need for a static seal between the lower plug opening 63 and the inlet port 17 of the valve body. When the valve is in the open position (FIG. 2), leakage across the lower trunnion seat can readily be accommodated since the branch gasket 43 will prevent loss of fluid from the interior of the valve body to the atmosphere through the connection of the valve branch to the main valve body.

The branch gasket 43 also prevents fluid loss through the branch connection when the valve is in the closed position which normally will expose the interior of the valve body to the pressure in the inlet line leading to the valve. The internal pressure within the valve body when the valve plug is in the closed position acts to bias the valve seat gasket 48 against the spherical surface of the plug, thus improving the seal. Stated otherwise, as the pressure increases within the interior of the valve, the force imposing the rubber seat gasket against the spherical valve surface increases, thus making for a better seal to withstand the high pressure conditions.

In a further aspect of the invention, the valve of FIGS. 2 and 3 is provided with a stop mechanism between the open and closed position located immediately above the lower trunnon seat. Preferably a balanced stop configuration is employed in order to lessen the likelihood of shear stresses rendering the stop mechanism inoperative. However, should this occur, the valve plug can still be operated, albeit without automatically coming to rest in the open or closed position. The stop mechanism is best illustrated in FIG. 10 which is a section view taken along line 10—10 of FIG. 2. As shown in FIG. 10, internal diametrically opposed stop shoulders 84 and 85 extend inwardly from the valve barrel surface immediately above the trunnion seat 15. The valve plug 10 is provided with corresponding diametrically opposed detent protrusions 87 and 88 which are adapted to abut the stop shoulders in the open and closed positions. In the open position illustrated in FIGS. 3, 5 & 7, detent surfaces 87a and 88a abut the stop shoulders. When the valve is placed in the closed position by rotating the valve plug 90° clockwise from the position as viewed in FIGS. 5 and 7, the opposed detent surfaces 87b and 88b abut the stop shoulders. While only a single stop shoulder and detent protrusion arrangement can be employed, the dual stop configuration illustrated offers significant advantages. The stresses imposed between the valve plug and valve body are balanced when the valve position is changed. The likelihood of shearing is reduced by the use of the dual mechanism. Further, should both shoulders be sheared off, the valve will still operate throughout 360° of rotation.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a valve for the control of fluid flow,
   (a) a valve body having spaced upper and lower trunnion seats and a plurality of fluid ports, at least one of said ports being a control port located at a position intermediate said trunnion seats and another of said ports being a lower port angularly displaced relative to said control port and extending through said lower trunnion seat said lower trunnion seat being of a smaller diameter than said upper trunnion seat;
   (b) a unitary plastic valve plug disposed in said valve body and having upper and lower trunnion sections journaled in said trunnion seats for rotation of said valve plug within said valve body and an intermediate section adjacent said control port said intermediate section having a diameter less than the diameter of said upper trunnion section and providing a clearance space between said intermediate section and said valve body;
   (c) a control passage extending through said valve plug from a lower opening in said valve plug in fluid communication with said lower port to a second opening in said intermediate section of said valve plug adapted to be in fluid communication with said control port; and
   (d) actuating means for rotating said valve plug relative to said valve body between a first angular position in which said second opening in said valve plug is aligned with said control port and a second angular position in which said second plug opening is angularly displaced relative to said control port whereby the outer surface of said intermediate section closes said control port.

2. The combination of claim 1 wherein said actuating means comprises a reduced upper protrusion of said valve plug extending upwardly through an upper opening in said valve body.

3. The combination of claim 2 further comprising an O-ring seal between said upper trunnion seat and said upper trunnion bearing section of said valve plug.

4. The combination of claim 3 wherein said O-ring seal is disposed in a groove within said upper trunnion section.

5. The combination of claim 2 further comprising a reduced annular groove in said valve plug upper protrusion adjacent the upper end of said valve body and a bonnet cap having an aperture therein through which said protrusion extends, said bonnet fitting into said reduced annular groove.

6. The combination of claim 1 further comprising a stop shoulder in said valve body and a detent protrusion formed integrally with said valve plug and adapted to contact said stop shoulder upon rotation of said valve plug within said valve body to an opened position in which said second plug opening and said control port are aligned.

7. The combination of claim 6 further comprising at least two of said stop shoulders in an opposed relationship and at least two of said detent protrusions in an opposed relationship adapted to contact said respective stop shoulders when said valve plug is in said open position.

8. The combination of claim 6 wherein said stop shoulder and said detent protrusion are located intermediate said control port and said lower trunnion seat.

9. The combination of claim 8 wherein said lower trunnion seat receives said lower trunnion section in a downward thrust bearing relationship.

10. The combination of claim 1 further comprising an internally threaded opening in the side of said valve body, a valve branch having an externally threaded end secured in place in said threaded opening and extending into the interior of said valve body to provide said control port, and a compressible seat gasket disposed inside of said valve branch end and extending into contact with said valve plug intermediate section to provide a seal between said control port and said valve plug.

11. The combination of claim 10 wherein said compressible seat gasket comprises an interiorly extending shoulder section and further comprising an annular gasket retainer disposed rearwardly of said gasket shoulder and compressed against said gasket shoulder by said valve branch when said branch is threaded into position within said valve body.

12. The combination of claim 1 further comprising a third port in said valve body located at a position circumferentially angularly disposed from said first recited control port.

13. The combination of claim 1 wherein said intermediate section of said valve plug is of a spherical shape adjacent said control port.

14. The combination of claim 13 wherein said spherical shaped intermediate section has a reduced cord face disposed adjacent said control port, and said second open in said valve plug is in the reduced cord face of said intermediate section.

15. The combination of claim 14 further comprising a compressible seat gasket mounted between said control port and said intermediate section of said valve plug whereby rotation of said valve plug from said first angular position to said second angular position causes the surface of said intermediate plug section to compress said seat gasket.

16. In a valve for controlling the flow of fluid, the combination comprising:
(a) a valve body having a pair of spaced upper and lower trunnion seats therein and a plurality of fluid ports, at least one of said ports being a control port at a location intermediate to said trunnion seats;
(b) a valve plug disposed in said valve body and having upper and lower trunnion sections journaled in said upper and lower trunnion seats for rotational movement of said valve plug in said valve body and an intermediate spherical shaped control section having a reduced chord face adapted to be disposed adjacent said control port;
(c) a flow passage in said valve plug extending from a first plug opening in communication with one of said valve body ports to a second plug opening in the reduced chord face of said control section; and
(d) a compressible seat gasket mounted between said control port and said valve plug whereby rotation of said valve plug from an open position in which said second plug opening and said control port are in fluid communication to a closed position in which said second plug opening is angularly displaced from said control port causes the surface of said intermediate plug section to compress said seat gasket.

17. The combination of claim 16 wherein said compressible seat gasket has a flared inner surface.

18. The combination of claim 17 wherein said compressible seat gasket comprises an interiorally extending shoulder section behind said flared inner surface and further comprising gasket retainer means disposed behind said gasket shoulder and compressed against said gasket shoulder section.

19. The combination of claim 16 wherein said valve plug has a second reduced cord face in said intermediate spherical shaped control section, said second reduced cord face being angularly disposed relative to said first recited reduced cord face and having an opening therein in communication with said flow passage in said valve plug.

20. The combination of claim 16 further comprising a reduced upper protrusion of said valve plug extending upwardly through an upper opening in said valve body to the exterior thereof to provide an actuating stem for said valve plug.

21. The combination of claim 20 further comprising an O-ring seal between said upper trunnion seat and said upper trunnion section of said valve plug.

22. The combination of claim 16 further comprising a stop shoulder in said valve body and a detent protrusion formed integrally with said valve plug and adapted to contact said stop shoulder upon rotation of said valve plug within said valve body to an opened position in which said second plug opening and said control port are aligned.

23. The combination of claim 22 further comprising at least two of said stop shoulders in an opposed relationship and at least two of said detent protrusions in an opposed relationship adapted to contact said respective stop shoulders when said valve plug is in said open position.

24. The combination of claim 23 wherein said stop shoulders and said detent protrusions are located intermediate said control port and said lower trunnion seat.

25. The combination of claim 16 further comprising an internally threaded opening in the side of said valve body, a valve branch having an externally threaded end secured in place in said threaded opening and extending into the interior of said valve body to provide said control port, and said compressible seat gasket is disposed inside of said valve branch end.

26. The combination of claim 25 wherein said compressible seat gasket comprises an interiorally extending shoulder section and further comprising an annular gasket retainer disposed rearwardly of said gasket shoulder and compressed against said gasket shoulder by valve branch when said branch is threaded into position within said valve body.

27. In a valve for controlling the flow of fluid, the combination comprising:
(a) a valve body having a pair of spaced upper and lower trunnion seats therein and having a plurality of fluid ports including at least two control ports positioned in said valve body at angularly displaced positions relative to one another intermediate of said trunnion seats;
(b) a valve plug disposed in said valve body and having upper and lower trunnion sections journaled in said upper and lower trunnion seats for rotational movement of said valve plug in said valve body and having an intermediate spherical shaped control section, said control section having at least one reduced cord face adapted to be disposed adjacent to at least one of said intermediate control ports;

(c) a flow passage in said valve plug extending between a plurality of plug openings in said valve plug, one of said plug openings being in the reduced cord face of said control section;

(d) a first compressible seat gasket mounted between one of said control ports and said valve plug whereby rotation of said valve plug from an open position in which said reduced cord face plug opening and said control port are in fluid communication to a closed position in which said reduced cord face plug opening is angularly displaced from said control port causes the surface of said intermediate plug section to compress said seat gasket; and (e) a second compressible seat gasket mounted between another of said control ports and said valve plug.

28. The combination of claim 27 wherein said intermediate spherical shaped control section comprises a second reduced cord face having a second valve plug opening therein extending from said flow passage in said valve plug.

29. The combination of claim 28 wherein said control ports and said reduced cord face plug openings are angularly displaced in an in-line relationship wherein one of said control ports serves as an inlet and another of said control ports serves as an outlet.

30. In a valve for the control of fluid flow, (a) a valve body having spaced upper and lower trunnion seats and a plurality of fluid ports, at least one of said ports being a control port located at a position intermediate said trunnion seats and another of said ports being a lower port angularly displaced relative to said control port and extending through said lower trunnion seat;

(b) a unitary plastic valve plug disposed in said valve body and having upper and lower trunnion sections journaled in said trunnion seats for rotation of said valve plug within said valve body and an intermediate section adjacent said control port;

(c) a control passage extending through said valve plug from a lower opening in said valve plug in fluid communication with said lower port to a second opening in said intermediate section of said valve plug adapted to be in fluid communication with said control port;

(d) actuating means for rotating said valve plug relative to said valve body between a first angular position in which said second opening in said valve plug is aligned with said control port and a second angular position in which said second plug opening is angularly displaced relative to said control port whereby the outer surface of said intermediate section closes said control port, said actuating means comprising a reduced upper protrusion of said valve plug extending upwardly through an upper opening in said valve body;

(e) a reduced annular groove in said valve plug upper protrusion adjacent the upper end of said valve body said valve plug protrusion being tapered to accommodate the insertion of the hereinafter recited bonnet cap over said protrusion; and (f) a bonnet cap having an aperture therein through which said protrusion extends and fitting into said reduced annular groove.

31. The combination of claim 30 further comprising an annular moisture packing disposed underneath said bonnet cap.

* * * * *

UNITED STATES PATENT AND TRADEMARK OFFICE
CERTIFICATE OF CORRECTION

PATENT NO. : 4,809,949

DATED : March 7, 1989

INVENTOR(S) : Kenneth E. Rakieski

It is certified that error appears in the above-identified patent and that said Letters Patent is hereby corrected as shown below:

Abstract, title page, line 16, change "section" to --second--.

Col. 3, line 27, delete "15".

Col. 5, line 55, change "are" to --area--.

Signed and Sealed this

Ninth Day of April, 1991

Attest:

HARRY F. MANBECK, JR.

Attesting Officer

Commissioner of Patents and Trademarks